United States Patent
Fung et al.

(10) Patent No.: US 11,101,711 B2
(45) Date of Patent: Aug. 24, 2021

(54) BRUSHLESS DIRECT CURRENT MOTOR, STATOR PART AND WINDING METHOD THEREOF

(71) Applicant: Johnson Electric S.A., Murten (CH)

(72) Inventors: Chi Ho Fung, Hong Kong (CN); Kar Wai Lam, Hong Kong (CN); Yung Fai Tsui, Hong Kong (CN); Wei Liang Huang, Shenzhen (CN); Deng Zhi Huang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 678 days.

(21) Appl. No.: 15/618,847

(22) Filed: Jun. 9, 2017

(65) Prior Publication Data

US 2017/0358966 A1 Dec. 14, 2017

(30) Foreign Application Priority Data

Jun. 14, 2016 (CN) .......................... 201610417014.2

(51) Int. Cl.
| | |
|---|---|
| *H02K 3/28* | (2006.01) |
| *H02K 15/095* | (2006.01) |
| *H02K 15/00* | (2006.01) |
| *H02K 3/18* | (2006.01) |
| *H02K 3/52* | (2006.01) |
| *H02K 5/22* | (2006.01) |

(52) U.S. Cl.
CPC ................. *H02K 3/28* (2013.01); *H02K 3/18* (2013.01); *H02K 3/522* (2013.01); *H02K 15/0068* (2013.01); *H02K 15/095* (2013.01); *H02K 5/225* (2013.01); *H02K 2211/03* (2013.01)

(58) Field of Classification Search
CPC .... H02K 15/0068; H02K 15/095; H02K 3/18; H02K 3/28; H02K 2211/03; H02K 3/522; H02K 5/225
See application file for complete search history.

(56) References Cited

U.S. PATENT DOCUMENTS

| | | | | |
|---|---|---|---|---|
| 8,188,624 | B2* | 5/2012 | Noh ........................ | H02K 5/225 310/43 |
| 8,247,935 | B2* | 8/2012 | Onozawa ................ | H02K 29/08 310/68 B |
| 2008/0054735 | A1* | 3/2008 | Yoshida .................. | H02K 3/522 310/43 |
| 2008/0116755 | A1* | 5/2008 | Sahara .................... | H02K 3/522 310/71 |

(Continued)

FOREIGN PATENT DOCUMENTS

| | | |
|---|---|---|
| CN | 201533207 U | 7/2010 |
| CN | 201533207 U | 7/2010 |

(Continued)

*Primary Examiner* — Bernard Rojas
(74) *Attorney, Agent, or Firm* — Muncy, Geissler, Olds & Lowe, P.C.

(57) ABSTRACT

A brushless direct current motor, a stator part and its winding method are provided. The stator part includes a stator core and stator windings wound around stator poles. The stator poles and the stator windings are arranged in a one-to-one correspondence with each other. The stator windings are formed by winding a single conductive wire uninterruptedly on the stator poles. Two ends of the conductive wire are connected.

11 Claims, 6 Drawing Sheets

(56) References Cited

U.S. PATENT DOCUMENTS

| | | | | |
|---|---|---|---|---|
| 2009/0127964 A1* | 5/2009 | Yumoto | ............... | H02K 3/522 |
| | | | | 310/195 |
| 2010/0133940 A1* | 6/2010 | Grossmann | ............ | H02K 1/278 |
| | | | | 310/156.46 |
| 2013/0270934 A1* | 10/2013 | Smith | .................... | H02K 3/521 |
| | | | | 310/50 |
| 2018/0175694 A1* | 6/2018 | Keil | ........................ | H02K 3/50 |

FOREIGN PATENT DOCUMENTS

| | | |
|---|---|---|
| CN | 102163885 A | 8/2011 |
| CN | 202206212 U | 4/2012 |
| CN | 202840705 U | 3/2013 |
| JP | 2015133809 A | 7/2015 |

* cited by examiner

BRUSHLESS DIRECT CURRENT MOTOR, STATOR PART AND WINDING METHOD THEREOF

CROSS REFERENCE TO RELATED APPLICATIONS

This non-provisional patent application claims priority under 35 U.S.C. § 119(a) from Patent Application No. 201610417014.2 filed in The People's Republic of China on Jun. 14, 2016.

FIELD OF THE INVENTION

The present invention relates to motor technology, and in particular to a brushless direct current motor, a stator part and its winding method.

BACKGROUND OF THE INVENTION

A brushless direct current motor includes a stator part and a rotor part. Windings of the stator part are often connected into a symmetrical three-phase Y configuration.

The windings of the stator part need to be formed by winding three conductive wires, such as copper wires, and require soldering operation and the operation of cutting off the excessive wire parts, which leads to a complicated assembly structure, a waste of conductive wires and high fabrication cost. In addition, due to the large number of wire terminals, loose connection of the conductive wires may easily occur. Therefore, additional glues are needed to fix the conductive wires which further increases the fabrication cost.

SUMMARY OF THE INVENTION

Thus, there is a desire for a stator part for simplifying the assembly structure and reducing the fabrication cost and the occurrence of conductive wire loosening. There is also a desire for a brushless direct current motor including the above stator part and a winding method for the stator part.

In one aspect, a stator part includes a stator core and stator windings. The stator windings are wound around stator poles of the stator core. The stator poles and the stator windings are arranged in a one-to-one correspondence with each other. The stator windings are formed by winding a single conductive wire uninterruptedly on the stator poles. Two ends of the conductive wire are connected.

Preferably, in the stator part, there are six stator poles including a first stator pole, a second stator pole, a third stator pole, a fourth stator pole, a fifth stator pole, and a sixth stator pole, arranged in that order. The conductive wire is sequentially wound around the first stator pole, the fourth stator pole, the third stator pole, the sixth stator pole, the fifth stator pole, and the second stator pole.

Preferably, in the stator part, the stator core comprises a first axial end and a second axial end. The first axial end is provided with a part for connecting with a power source. In a view when viewed in a direction from the first axial end toward the second axial end of the stator core, the first stator pole, the second stator pole, the third stator pole, the fourth stator pole, the fifth stator pole and the six stator pole are arranged sequentially in a clockwise direction.

Preferably, in the stator part, the stator core comprises a first axial end and a second axial end, the first axial end is provided with a part for connecting with a power source. In a view when viewed in a direction from the first axial end toward the second axial end of the stator core, the first stator pole, the second stator pole, the third stator pole, the fourth stator pole, the fifth stator pole and the six stator pole are arranged sequentially in a counter-clockwise direction.

Preferably, in the stator part, the stator windings are wound around the stator poles in a same direction.

Preferably, in the stator part, the stator part further comprises at least one electrically conductive terminal disposed at an end of the stator core for positioning at least one conductive wire part located between two adjacent stator poles.

Preferably, in the stator part, the electrically conductive terminal comprises a fixing portion fixed on the stator core, and a hook portion connected to the fixing portion.

Preferably, in the stator part, the fixing portion is disposed at an outer periphery of the stator core, and the hook portion is disposed on one side of the fixing portion opposite from the stator pole.

Preferably, in the stator part, the fixing portion and the hook portion are an integral structure and are formed by bending.

Preferably, the number of the stator poles is 2n, and the number of the electrically conductive terminals (3) is n, the electrically conductive terminals are uniformly spaced, and each electrically conductive terminal is located between two adjacent stator poles.

Preferably, in the stator part, the number of the conductive wire parts is n, each conductive wire part is located between two adjacent stator poles, and the plurality of the electrically conductive terminals are arranged in a one-to-one correspondence with the conductive wire parts.

Preferably, in the stator part, the two ends of the conductive wire are crossed and fixed on a same one of the electrically conductive terminals.

Preferably, in the stator part, the stator part further comprises a PCB for connecting with a power source, and the PCB is connected with the n electrically conductive terminals.

Preferably, in the stator part, the stator part further comprises wiring terminals for connecting with a power source, the wiring terminals connecting in a one-to-one correspondence with the electrically conductive terminals.

Preferably, in the stator part, there are three electrically conductive terminals including a first electrically conductive terminal, a second electrically conductive terminal, and a third electrically conductive terminal. There are three wiring terminals including a first wiring terminal connected with the first electrically conductive terminal, a second wiring terminal connected with the second electrically conductive terminal, and a third wiring terminal connected with the third electrically conductive terminal.

Preferably, in the stator part, the first wiring terminal, the second wiring terminal and the third wiring terminal are all disposed between the second electrically conductive terminal and the third electrically conductive terminal; the first electrically conductive terminal is connected with the first wiring terminal via a PCB.

Preferably, in the stator part, the second electrically conductive terminal and the second wiring terminal are integrally formed, the third electrically conductive terminal and the third wiring terminal are integrally formed, while the first electrically conductive terminal and the first wiring terminal are separately formed.

In another aspect, a brushless direct current motor is provided which includes a rotor part and a stator part. The stator part is any one of the stator parts described above.

Preferably, in the stator part, the rotor part of the motor has four permanent conductive poles, and the number of the stator poles of the stator part is six.

In still another aspect, a winding method for any of the stator parts described above is provided. The winding method includes the steps of:

winding a single conductive wire around all stator poles of the stator core according to a winding sequence to form a plurality of stator windings; and connecting the two ends of the conductive wire.

As can be seen from the above technical solutions, the present invention provides a stator part, in which a single conductive wire is wound around all stator poles of the stator core according to a desired winding sequence, and the two ends of the conductive wire are connected to complete the assembly of the stator part. The stator part provided by the present invention includes only one conductive wire. By winding the conductive wire on all of the stator poles of the stator core, the conductive wire forms a plurality of stator windings in a one-to-one correspondence with the stator poles. In comparison with the existing stator part including multiple conductive wires and requiring soldering connection, the stator part provided by the present invention includes only one conductive wire, which eliminates the operation of soldering connection between wire terminals of the multiple conductive wires, thereby avoiding the operation of cutting off the excessive wire parts after the soldering connection, effectively simplifying the assembly structure of the stator part, as well as reducing the fabrication cost. In addition, the conductive wire has less parts that need to be fixed, which reduces the occurrence of loosening of the conductive wire.

The present invention further provides a brushless direct current motor including the above stator part and a winding method for the stator part, which have the same technical results as the above stator part, explanations of which are therefore not repeated herein.

BRIEF DESCRIPTION OF THE DRAWINGS

In order to more clearly describe the technical solutions in the prior art or the embodiments of the present invention, the accompanying drawings to be used in the descriptions of the prior art or the embodiments are briefly introduced as follows. Obviously, the following accompanying drawings just illustrate some embodiments of the present invention, and people skilled in the art can obtain other drawings from these drawings without paying creative efforts.

DETAILED DESCRIPTION OF THE PREFERRED EMBODIMENTS

The present invention provides a stator part to simplify the assembly structure, reduce the fabrication cost and the occurrence of conductive wire loosening. The present invention further provides a brushless direct current motor including the stator part and a winding method of the stator part.

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

Figure 1:
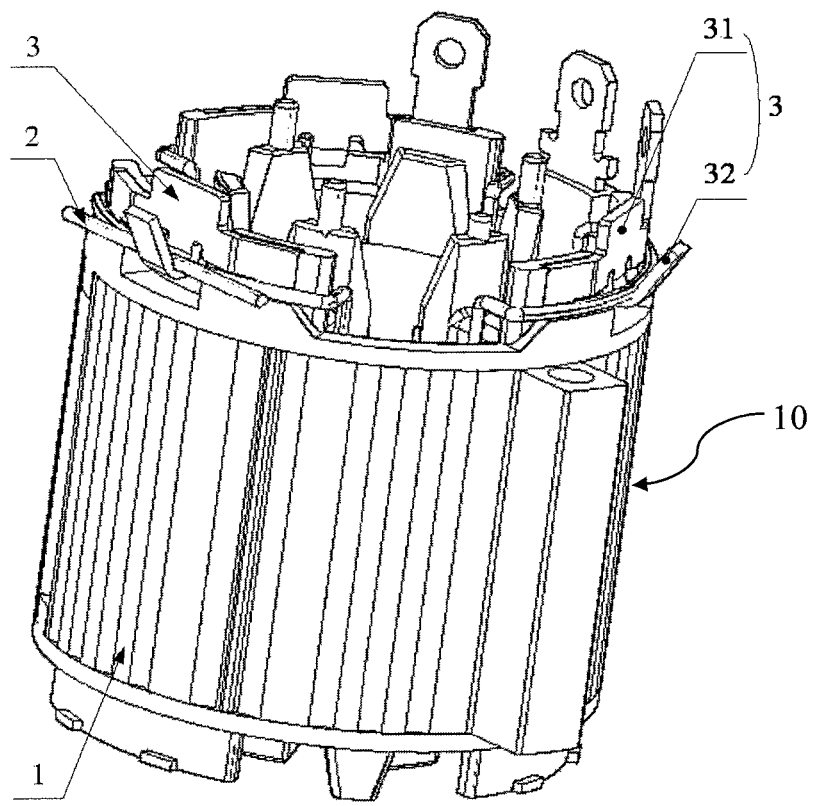
FIG. 1 illustrates a stator part according to one embodiment of the present invention.
Figure 2:
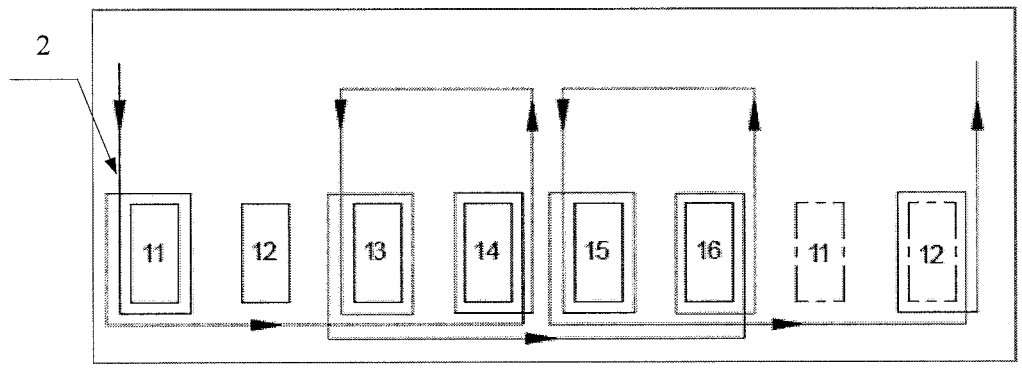
FIG. 2 illustrates a winding manner of the stator part according to one embodiment of the present invention.

Referring to FIG. 1 and FIG. 2, FIG. 1 illustrates a stator part 10 according to one embodiment of the present invention, and FIG. 2 is a schematic view of windings of the stator part 10 according to one embodiment of the present invention.

The stator part 10 according to one embodiment of the present invention includes a stator core 1 and a conductive wire 2. Stator poles of the stator core 1 are wound with stator windings. There are a plurality of the stator poles and stator windings, which are arranged in a one-to-one correspondence with each other. The plurality of stator windings are formed by winding the single conductive wire 2 uninterruptedly on the plurality of stator poles. Two ends of the conductive wire 2 are connected. That is, the single conductive wire 2 is wound on the plurality of stator poles of the stator core 1 to form the plurality of stator windings. In addition, the two ends of the conductive wire 2 lead out of the stator core 1 and are connected at a first axial end of the stator core 1.

In the stator part 10 provided by the embodiment of the present invention, the single conductive wire 2 is wound on all of the stator poles of the stator core 1 in a desired winding sequence, and the two ends of the conductive wire 2 are connected to complete the assembly of the stator part 10. The stator part 10 provided by the embodiment of the present invention includes only one conductive wire 2. By winding the conductive wire 2 on all of the stator poles of the stator core 1, the conductive wire 2 forms a plurality of stator windings in a one-to-one correspondence with the stator poles. In comparison with the existing stator part 10 including multiple conductive wires and requiring soldering connection, the stator part 10 provided by the embodiment of the present invention includes only one conductive wire 2, which eliminates the operation of soldering connection between wire terminals of the multiple conductive wires, thereby avoiding the operation of cutting off the excessive wire parts after the soldering connection, effectively simplifying the assembly structure of the stator part 10, as well as reducing the fabrication cost. In addition, the conductive wire 2 has less parts that need to be fixed, which reduces the occurrence of the conductive wire 2 loosening.

It should be understood that the single conductive wire 2 is wound uninterruptedly on the plurality of stator poles. That is, during the winding process of the conductive wire 2, the conductive wire 2 is not cut apart and is maintained as a whole wire.

As shown in FIG. 2, in this embodiment, there are six stator poles including a first stator pole 11, a second stator pole 12, a third stator pole 13, a fourth stator pole 14, a fifth stator pole 15, and a sixth stator pole 16, arranged in that order. In prior arts, the first stator pole and the fifth stator pole are wound with one conductive wire, the second stator pole and the fifth pole are wounded with one conductive wire, and the third stator pole and the six stator pole are wound with one conductive wire. In this embodiment, the conductive wire 2 are sequentially wound around the first stator pole 11, the fourth stator pole 14, the third stator pole 13, the sixth stator pole 16, the fifth stator pole 15, and the second stator pole 12.

It should be understood that the conductive wire 2 is wound on the end of the stator core 1 after wound around the first stator pole 11 and the fourth stator pole 14, the conductive wire 2 is then wound around the third stator pole 13 and the sixth pole 16 and then on the end of the stator core 1, and then around the fifth stator pole 15 and the second stator pole 12, and then two ends of the conductive wire 2 are connected on the end of the stator core 1 between the second stator pole 12 and the first stator pole 11. That is, conductive wire parts between the fourth stator pole 14 and the third stator pole 13, between the sixth stator pole 16 and the fifth stator pole 15, and between the second stator pole 12 and the first stator pole 11, are located on the end of the stator core 1.

The stator core 1 has a second axial end and a first axial end, and the first axial end is provided with a part for connecting with a power source.

In a first implementation, when viewed in a direction from the first axial end toward the second axial end of the stator core 1, the first stator pole 11, the second stator pole 12, the third stator pole 13, the fourth stator pole 14, the fifth stator pole 15 and the sixth stator pole 16 are arranged sequentially in a clockwise direction.

FIG. 2 is an unfolded view of the six stator poles along a circumferential direction of the stator core 1. An upper side of the FIG. 2 represents the first axial end of the stator core 1, and a lower side of the FIG. 2 represents the second axial end of the stator core 1. The conductive wire 2 is sequentially wound around the first stator pole 11, the fourth stator pole 14, the third stator pole 13, the six stator pole 16, the fifth stator pole 15, and the second stator pole 12 along the winding direction as described above.

In a second implementation, when viewed in the direction from the first axial end toward the second axial end of the stator core 1, the first stator pole 11, the second stator pole 12, the third stator pole 13, the fourth stator pole 14, the fifth stator pole 15 and the sixth stator pole 16 are arranged sequentially in a counter-clockwise direction.

Figure 3:
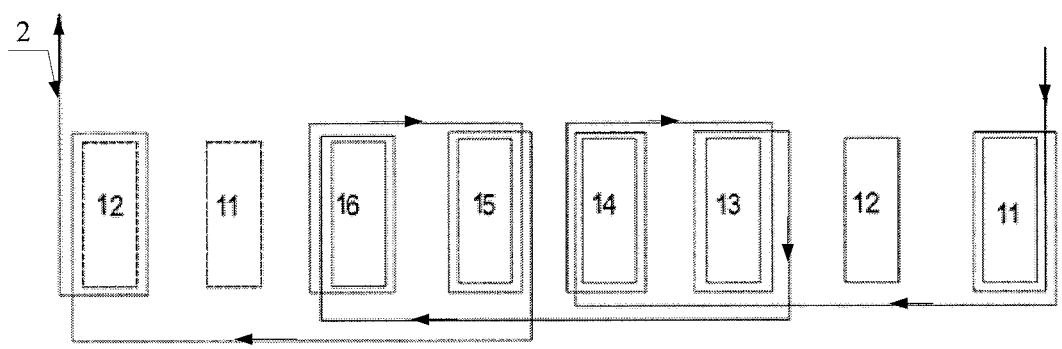
FIG. 3 illustrates another winding manner of the stator part according to one embodiment of the present invention.

FIG. 3 is an unfolded view of the six stator poles along a circumferential direction of the stator core 1. An upper side of the FIG. 3 represents the first axial end of the stator core 1, and a lower side of the FIG. 3 represents the second axial end of the stator core 1. The conductive wire 2 is sequentially wound around the first stator pole 11, the fourth stator pole 14, the third stator pole 13, the sixth stator pole 16, the fifth stator pole 15, and the second stator pole 12 along the winding direction as described above.

In embodiments of the present invention, the plurality of stator windings have a same winding direction. That is, during winding the conductive wire 2 around the six stator poles, the conductive wire 2 is wound around each of the six stator poles in the same direction.

In order to ensure the winding effect, the stator part 10 of the embodiment of the present invention further includes a plurality of electrically conductive terminals 3 disposed at an end of the stator core 1 for respectively positioning the conductive wire parts located between corresponding two adjacent stator poles. It should be understood that the end of the stator core 1 is the first axial end.

The arrangement of the electrically conductive terminals 3 can effectively position the conductive wire part between the fourth stator pole 14 and the third stator pole 13, the conductive wire part between the sixth stator pole 16 and the fifth stator pole 15, and the conductive wire part between the second stator pole 12 and the first stator pole 11, thereby ensuring winding structures of the stator windings on the stator part 10 to keep in shape.

Each electrically conductive terminal 3 includes a fixing portion 31 fixed on the stator core 1, and a hook portion 32 connected to the fixing portion 31. The conductive wire part is disposed within the hook portion 32. Alternatively, a fixing post may be arranged, and the conductive wire part is positioned by winding around the fixing post.

In the stator part 10 of the embodiment of the present invention, the fixing portion 31 is disposed at an outer periphery of the stator core 1, and the hook portion 32 is disposed on one side of the fixing portion 31 opposite from the stator pole. With this configuration, the conductive wire 2 is prevented from interfering with the hook portion 32 during the course of winding the conductive wire 2, which facilitates the winding of the conductive wire 2 and hence assembly of the stator part 10.

The fixing portion 31 and the hook portion 32 are an integral structure and are formed by bending. That is, a sheet metal or a similar sheet structure is bent to form a bent structure, with one end of the bent structure acting as the fixing portion 31 and the hook portion 32 formed at the bent area. The fixing portion 31 and the hook portion 32 are formed into an integral structure, which facilitates the manufacturing of the electrically conductive terminal 3.

The plurality of the electrically conductive terminals are in a one-to-one correspondence with the conductive wire parts between adjacent two stator poles. Alternatively, there may be a single electrically conductive terminal 3 having a plurality of hook portions 32 in a one-to-one correspondence with the conductive wire parts between adjacent two stator poles. It is noted that the conductive wire parts between adjacent two stator poles may be the conductive wire part between the fourth stator pole 14 and the third stator pole 13, the conductive wire part between the sixth stator pole 16 and the fifth stator pole 15, and the conductive wire part between the second stator pole 12 and the first stator pole 11 that are wound at the end of the stator core 1.

For facilitating fixing two ends of the conductive wire 2, the two ends of the conductive wire 2 are crossed and fixed on a same electrically conductive terminal 3.

Figure 4:
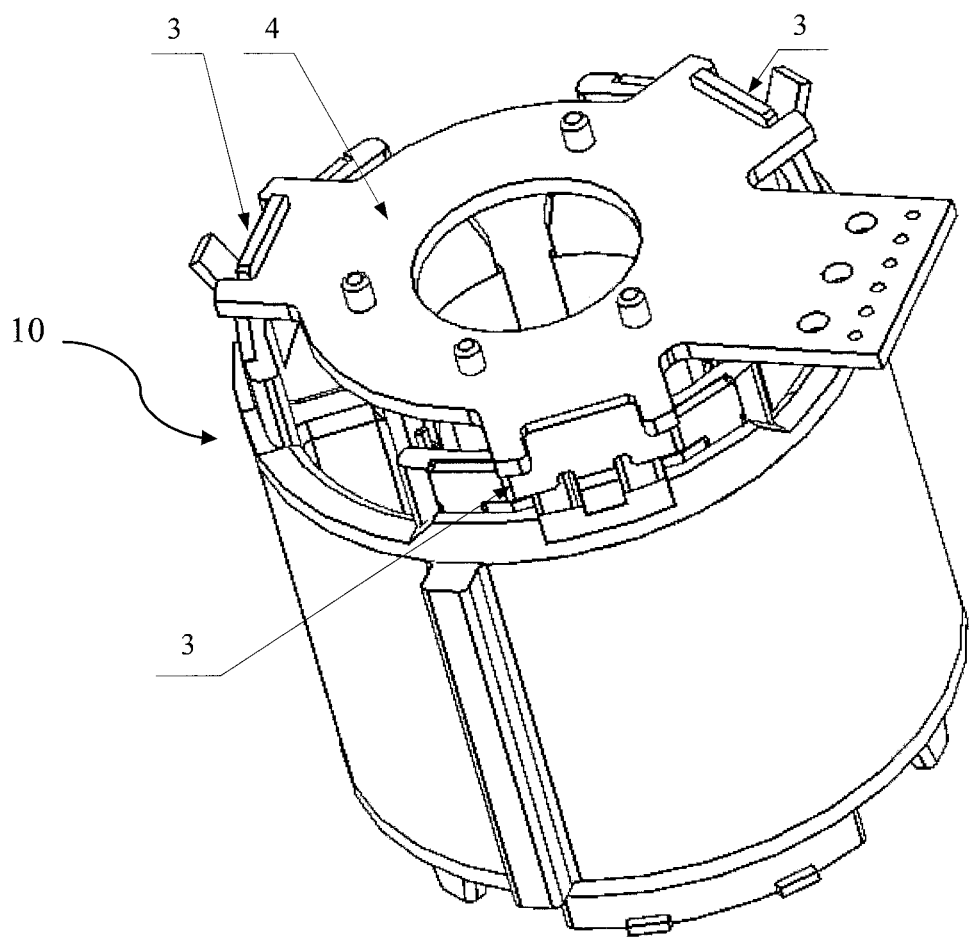
FIG. 4 illustrates a PCB assembly structure of the stator part according to one embodiment of the present invention.

In order to ensure the conducting effect, the number of the stator poles is 2n, and the number of the electrically conductive terminals 3 is n. That is, the conductive wire parts between adjacent two stator poles are connected with the electrically conductive terminals 3, with each stator pole arranged in correspondence with one unique electrically conductive terminal 3. As shown in FIG. 4, the number of the stator poles of this embodiment is six, and the number of the electrically conductive terminals 3 is three. Referring to FIG. 2 and FIG. 4, in this embodiment, the electrically conductive terminals 3 are disposed between the fourth stator pole 14 and the third stator pole 13, between the sixth stator pole 16 and the fifth stator pole 15, and between the second stator pole 12 and the first stator pole 11, respectively.

In a first connecting manner, the stator part 10 further incudes a printed circuit board (PCB) 4 for connecting with a power source. The n electrically conductive terminals 3 are all connected to the PCB 4 and then connected with the power source through the PCB 4. This configuration simplifies a wiring structure and facilitates the assembly of the stator part 10.

In a second connecting manner, the stator part 10 further includes wiring terminals for connecting with a power source. The wiring terminals are connected in a one-to-one correspondence with the electrically conductive terminals 3.

Figure 5:
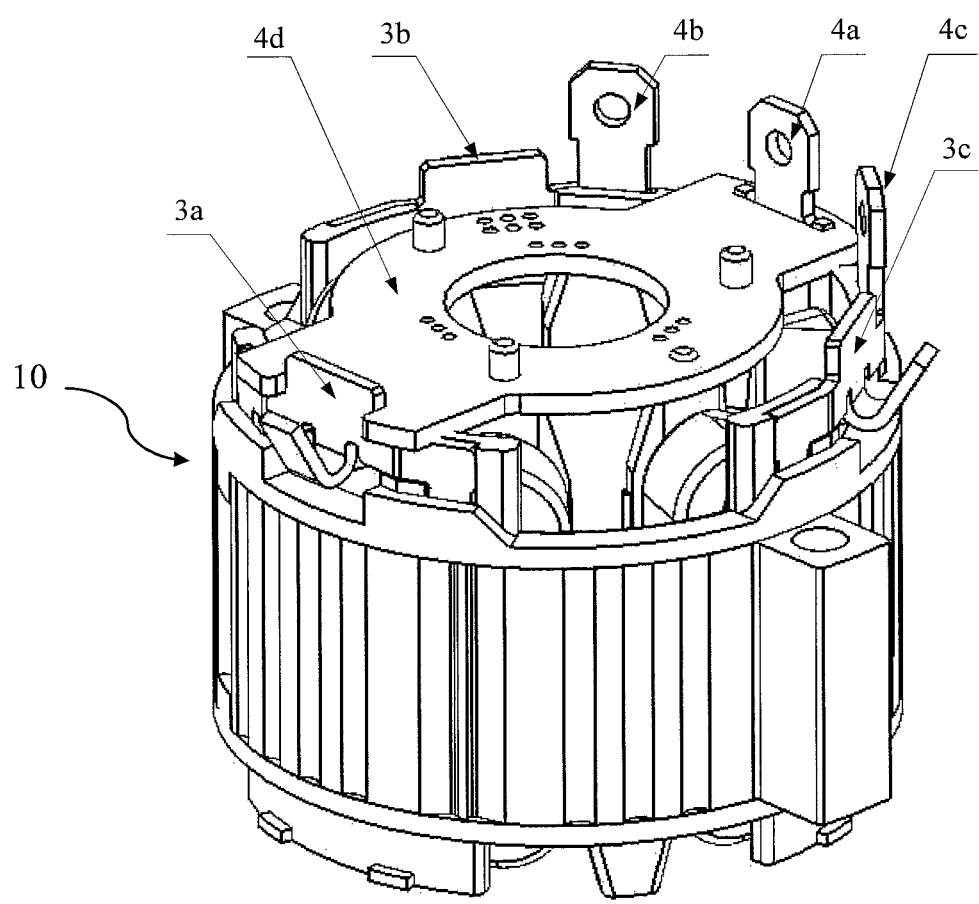
FIG. 5 illustrates another PCB assembly structure of the stator part according to one embodiment of the present invention.

Referring to FIG. 5, in this embodiment, the number of the stator poles is six. Therefore, there are three electrically conductive terminals, including a first electrically conductive terminal 3a, a second electrically conductive terminal 3b, and a third electrically conductive terminal 3c. There are also three wiring terminals, including a first wiring terminal 4a connected with the first electrically conductive terminal 3a, a second wiring terminal 4b connected with the second electrically conductive terminal 3b, and a third wiring terminal 4c connected with the third electrically conductive terminal 3c.

Figure 7:
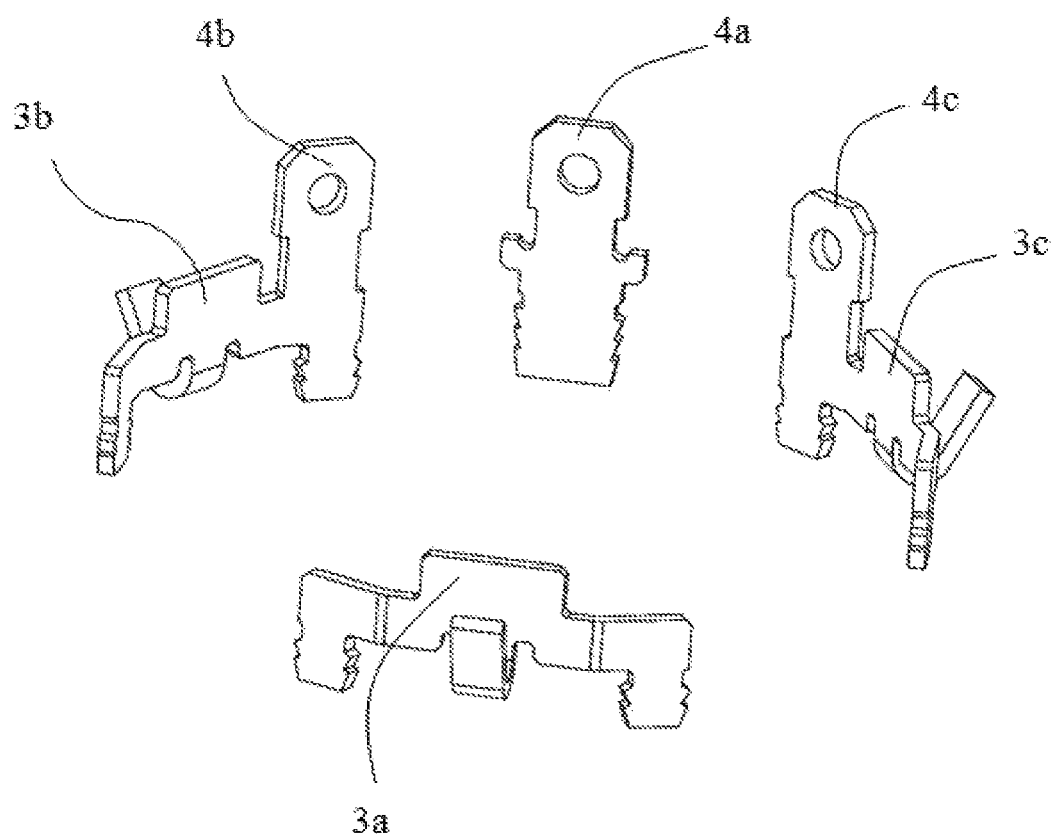
FIG. 7 illustrates electrically conductive terminals and wiring terminals of FIG. 1.

In order to simplify the wiring structure, the plurality of wiring terminals are centralizedly arranged, with the first wiring terminal 4a, the second wiring terminal 4b and the third wiring terminal 4c all disposed between the second electrically conductive terminal 3b and the third electrically conductive terminal 3c. The second wiring terminal 4b is adjacent the second electrically conductive terminal 3b, and the third wiring terminal 4c is adjacent the third electrically conductive terminal 3c. Therefore, it can be ensured that the second wiring terminal 4b is connected with the second electrically conductive terminal 3b, and the third wiring terminal 4c is connected with the third electrically conductive terminal 3c. The first wiring terminal 4a is spaced a large distance from the first electrically conductive terminal 3a. Therefore, the first electrically conductive terminal 3a is connected with the first wiring terminal 4a via a PCB 4d. Preferably, the second electrically conductive terminal 3b and the second wiring terminal 4b are integrally formed, the third electrically conductive terminal 3c and the third wiring terminal 4c are integrally formed, while the first electrically conductive terminal 3a and the first wiring terminal 4a are separately formed, as shown in FIG. 7.

Figure 6:
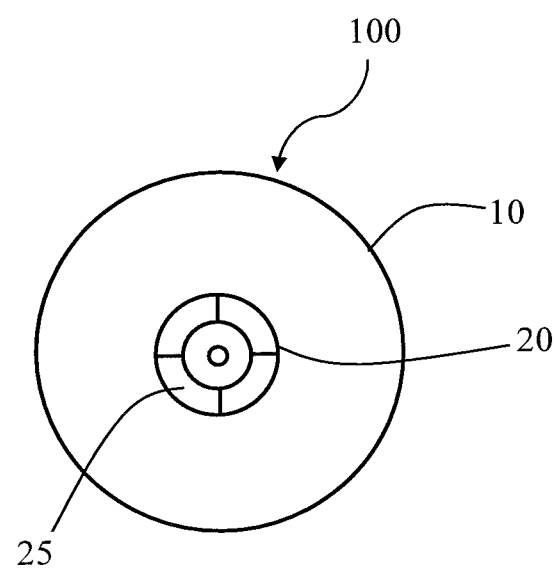
FIG. 6 is a schematic plan view of a brushless direct current motor of an embodiment of the present invention.

Referring to FIG. 6, one embodiment of the present invention further provides a brushless direct current motor 100 including a rotor part 20 and a stator part 10. The stator part 10 is in accordance with any of the stator parts 10 described above. Because the above stator parts 10 have the above technical effects, the brushless direct current motor 100 including the above stator part 10 should also have the same technical effects, explanations of which are therefore not repeated herein.

In this embodiment, the rotor part 20 of the motor 200 has four permanent conductive poles 25, and the number of the stator poles of the stator part 10 is six.

The present invention further provides a winding method for any of the stator parts 10 described above, including the following steps.

S1: a single conductive wire 2 is wound around all stator poles of the stator core 1 according to a winding sequence to form a plurality of stator windings.

In this embodiment, the winding sequence is from the first stator pole 11 to the fourth stator pole 14, the third stator pole 13, the six stator pole 16, the fifth stator pole 15, and finally to the second stator pole 12. In embodiments where another number of stator poles are arranged, the winding may be performed in another sequence as long as the function of the stator part 10 is realized.

S2: two ends of the conductive wire 2 are connected at the first axial end of the stator core 1.

The winding method for the stator part 10 provided by the present invention has the same technical results as the above stator part 10, explanations of which are therefore not repeated herein.

All embodiments in the specification are described in a progressive way, each embodiment mainly describes the differences from other embodiments, and the same and similar parts among the embodiments can be referenced mutually.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A stator part comprising:
a stator core comprising stator poles; and
stator windings wound around the stator poles, the stator poles and the stator windings being arranged in a one-to-one correspondence with each other, all of the stator windings being formed by winding a single conductive wire uninterruptedly on the stator poles, two ends of the conductive wire being connected, wherein
at least one electrically conductive terminal is disposed at an end of the stator core for positioning at least one conductive wire part located between two adjacent stator poles, wherein the number of the stator poles is 2n, and the number of the electrically conductive terminals is n, the electrically conductive terminals are uniformly spaced in a circumference of the stator core, and one of the electrically conductive terminals is located between each two different adjacent stator poles;
wiring terminals for connecting with a power source, the wiring terminals connecting in a one-to-one correspondence with the electrically conductive terminals, wherein there are three electrically conductive terminals including a first electrically conductive terminal, a second electrically conductive terminal, and a third electrically conductive terminal; there are three wiring terminals including a first wiring terminal connected with the first electrically conductive terminal, a second wiring terminal connected with the second electrically conductive terminal, and a third wiring terminal connected with the third electrically conductive terminal, and wherein the second electrically conductive terminal and the second wiring terminal are integrally formed, the third electrically conductive terminal and the third wiring terminal are integrally formed, while the first electrically conductive terminal and the first wiring terminal are separately formed, the first wiring terminal, the second wiring terminal and the third wiring terminal are all disposed between the second electrically conductive terminal and the third electrically conductive terminal.

2. The stator part of claim 1, wherein the stator core comprises a first axial end and a second axial end, the first axial end is provided with a part for connecting with a power source; the stator poles comprises a first stator pole, a second stator pole, a third stator pole, a fourth stator pole, a fifth stator pole and a sixth stator pole arranged sequentially in a clockwise direction or a counter-clockwise direction in a circumference of the stator core, the number of the electrically conductive terminals is three, the three electrically conductive terminals are respectively arranged between the forth stator pole and the third stator pole, between the sixth stator pole and the fifth stator pole, and between first stator pole and the second stator pole.

3. The stator part of claim 1, wherein the stator windings are wound around the stator poles in a same direction.

4. The stator part of claim 1, wherein the electrically conductive terminal comprises a fixing portion fixed on the stator core, and a hook portion connected to the fixing portion.

5. The stator part of claim 4, wherein the fixing portion is disposed at an outer periphery of the stator core, and the hook portion is disposed on one side of the fixing portion opposite from the stator pole.

6. The stator part of claim 4, wherein the fixing portion and the hook portion are an integral structure and are formed by bending.

7. The stator part of claim 1, wherein the number of the conductive wire parts is three, each conductive wire part is located between two adjacent stator poles, and the plurality of the electrically conductive terminals are arranged in a one-to-one correspondence with the conductive wire parts.

8. The stator part of claim 7, wherein the two ends of the conductive wire are crossed and fixed on a same one of the electrically conductive terminals.

9. The stator part of claim 1, wherein the first wiring terminal, the second wiring terminal and the third wiring terminal are all disposed between the second electrically conductive terminal and the third electrically conductive terminal; the first electrically conductive terminal is connected with the first wiring terminal via a PCB.

10. A brushless direct current motor comprising:
a rotor part; and
a stator part comprising:
a stator core comprising stator poles; and
stator windings wound around the stator poles of the stator core, the stator poles and the stator windings being arranged in a one-to-one correspondence with each other, all of the stator windings being formed by winding a single conductive wire uninterruptedly on the stator poles, two ends of the conductive wire being connected, at least one electrically conductive terminal disposed at an end of the stator core for positioning at least one conductive wire part located between two adjacent stator poles, wherein the number of the stator poles is 2n, and the number of the electrically conductive terminals is n, the electrically conductive terminals are uniformly spaced in a circumference of the stator core, and one of the electrically conductive terminals is located between two different adjacent stator poles;
wherein the rotor part comprises four permanent conductive poles, and the number of the stator poles of the stator part is six, there are three electrically conductive terminals including a first electrically conductive terminal, a second electrically conductive terminal, and a third electrically conductive terminal; there are three wiring terminals for connecting with a power source including a first wiring terminal connected with the first electrically conductive terminal, a second wiring terminal connected with the second electrically conductive terminal, and a third wiring terminal connected with the third electrically conductive terminal, and wherein the first wiring terminal, the second wiring terminal and the third wiring terminal are all disposed between the second electrically conductive terminal and the third electrically conductive terminal, the second electrically conductive terminal and the second wiring terminal are integrally formed, the third electrically conductive terminal and the third wiring terminal are integrally formed, while the first electrically conductive terminal and the first wiring terminal are separately formed.

11. The brushless direct current motor of claim 10, wherein the stator core comprises a first axial end and a second axial end, the first axial end is provided with a part for connecting with a power source; the stator poles comprises a first stator pole, a second stator pole, a third stator pole, a fourth stator pole, a fifth stator pole and a sixth stator pole arranged sequentially in a clockwise direction or a counter-clockwise direction in a circumference of the stator core, the number of the electrically conductive terminals is three, the three electrically conductive terminals are respectively arranged between the forth stator pole and the third stator pole, between the sixth stator pole and the fifth stator pole, and between first stator pole and the second stator pole.

* * * * *